United States Patent [19]

Miyata et al.

[11] 4,299,759
[45] Nov. 10, 1981

[54] METHOD FOR INHIBITING THE THERMAL OR ULTRAVIOLET DEGRADATION OF THERMOPLASTIC RESIN AND THERMOPLASTIC RESIN COMPOSITION HAVING STABILITY TO THERMAL OR ULTRAVIOLET DEGRADATION

[75] Inventors: Shigeo Miyata, Takamatsu; Masataka Kuroda, Kagawa, both of Japan

[73] Assignee: Kyowa Chemical Industry Co. Ltd., Tokyo, Japan

[21] Appl. No.: 150,651

[22] Filed: May 16, 1980

[51] Int. Cl.³ .............................................. C08K 3/20
[52] U.S. Cl. .......................... 260/45.7 R; 260/23 XA; 260/42.14; 260/45.7 P; 260/45.7 ST; 260/45.75 T
[58] Field of Search ............ 260/42.49, 45.7 R, 42.45, 260/42.46, 42.14

[56]  References Cited

U.S. PATENT DOCUMENTS

| 4,058,471 | 11/1977 | Glatti et al. | 260/42.49 |
| 4,067,847 | 1/1978 | Yui et al. | 260/45.7 R |
| 4,085,088 | 4/1978 | Miyata et al. | 260/45.7 R |
| 4,098,762 | 7/1978 | Miyata et al. | 260/45.7 R |
| 4,116,897 | 9/1978 | Huszar et al. | 260/42.46 |
| 4,132,691 | 1/1979 | Ejk | 260/42.49 |
| 4,154,718 | 5/1979 | Miyata et al. | 260/45.7 R |

FOREIGN PATENT DOCUMENTS 47-32198 of 1972 Japan.
48-8394 of 1973 Japan.
52-31259 of 1977 Japan.
52-30175 of 1977 Japan.
52-90192 of 1977 Japan.

Primary Examiner—John Kight, III
Assistant Examiner—R. A. White
Attorney, Agent, or Firm—Wenderoth, Lind & Ponack

[57]  ABSTRACT

A method for inhibiting the thermal or ultraviolet degradation of a thermoplastic resin containing halogen and/or acidic components excepting olefinic resins, which comprises mixing said thermoplastic resin with about 0.01 to about 5 parts by weight, per 100 parts by weight of said resin, of a hydrotalcite of the following formula

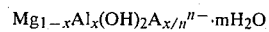

$$Mg_{1-x}Al_x(OH)_2 A_{x/n}{}^{n-}\cdot mH_2O$$

wherein $O < x \leq 0.5$, m is a positive number, and $A^{n-}$ represents an anion having a valence of n, or a product resulting from surface-treatment of said hydrotalcite with an anionic surface-active agent, said hydrotalcite having a BET specific surface area of not more than 30 m²/g; and a thermoplastic resin composition prepared by aforesaid method.

8 Claims, No Drawings

METHOD FOR INHIBITING THE THERMAL OR ULTRAVIOLET DEGRADATION OF THERMOPLASTIC RESIN AND THERMOPLASTIC RESIN COMPOSITION HAVING STABILITY TO THERMAL OR ULTRAVIOLET DEGRADATION

This invention relates to a method for inhibiting the thermal or ultraviolet degradation of thermoplastic resins containing halogens and/or acidic components excepting olefinic resins, and to a thermoplastic resin composition having stability to thermal or ultraviolet degradation prepared by the aforesaid method.

More specifically, this invention relates to a method for inhibiting the thermal or ultraviolet degradation of a thermoplastic resin containing halogens and/or acidic components excepting olefinic resins, which comprises mixing the thermoplastic resin with about 0.01 to about 5 parts by weight, per 100 parts by weight of the resin, of a hydrotalcite of the following formula

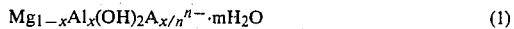

$$Mg_{1-x}Al_x(OH)_2A_{x/n}{}^{n-}\cdot mH_2O \qquad (1)$$

wherein $0 < x \leq 0.5$, m is a positive number, and $A^{n-}$ represents an anion having a valence of n, or a product resulting from surface-treatment of said hydrotalcite with an anionic surface-active agent, said hydrotalcite having a BET specific surface area of not more than 30 m$^2$/g; and to a thermoplastic resin composition prepared by the aforesaid method.

In accordance with this invention, thermoplastic resins containing halogens and/or acidic components attributed to catalysts and/or monomers and/or post-halogenation are stabilized against thermal or ultraviolet degradation. In the present invention, these thermoplastic resins exclude olefinic resins containing halogens derived from polymerization catalysts and/or post-halogenation. Examples of such thermoplastic resins are thermoplastic resins containing halogens and/or acidic components prepared by using catalysts containing halogens and/or acidic components such as sulfuric acid, boron trifluoride, tin tetrachloride and hydrochloric acid (e.g., styrene resins, AS resin, BS resin, ABS resin, acrylic resins or methacrylic resins); halogen-containing thermoplastic resins such as vinyl chloride polymer or copolymers, vinylidene chloride polymer or copolymers fluoroethylene polymers or copolymers and polymer blends containing vinyl chloride resins; chlorine or fluorine-containing rubbers such as chlorinated polyvinyl chloride chloroprene rubber and chlorinated isobutylene rubber; and halogen-containing thermoplastic resins such as post-chlorinated vinyl chloride polymer or copolymers or blends thereof; vinyl acetate polymer or copolymers such as polyvinylacetate or ethylene-vinylacetate copolymer.

These thermoplastic resins, because of the halogens and/or acidic components they contain, may corrode or rust the metallic portions of molding machines or molds during the molding operation. Moreover, under heat or ultraviolet light, these thermoplastic resins or molded products prepared therefrom tend to undergo degradation. According to this invention, these troubles of the thermoplastic resins having halogens and/or acidic components can be removed by a simple and low-cost method with a good reproducibility of the inhibiting effect using a specified thermal or ultraviolet degradation inhibitor which is nontoxic and is not likely to cause another trouble.

For example, it is known that thermoplastic resins containing halogens and/or acidic components derived from catalysts and/or monomers and/or post-halogenation, for example resins derived from halogen-containing monomers or comonomers, such as vinyl chloride polymer or copolymers, resins obtained by using catalysts such as boron trifluoride, tin tetrachloride or potassium persulfate, and post-halogenated resins such as post-chlorinated resins, because of the halogens and/or acidic components they contain, may corrode or rust the metallic portions of molding machines or molds, and also, these resins and molded products prepared therefrom undergo degradation under heat or ultraviolet light. For example, when exposed to heat or ultraviolet light, vinyl chloride resins undergo dechlorination within their molecular chains, and this results in the degradation and discoloration of the resins and the corrosion of molds in molding machines.

It is generally thought that the thermal decomposition of vinyl chloride resins is accelerated by the hydrogen chloride which is generated in the early stage of decomposition and acts catalytically. Hence, neutralization and trapping of the hydrogen chloride in the early stage of decomposition would contribute to the stabilization of vinyl chloride resins. Based on this thought, an attempt was made to add the hydroxides and oxides of alkaline earth metals to the vinyl chloride resins, and this brought about some effect (see Japanese Pat. Nos. 30175/77 and 31259/77). But the use of such additives in effective amounts frequently renders their dispersion in the resins poor, and particularly if such a resin composition is formed into a film, its quality will be impaired.

Fire retardants comprising hydrotalcites having a BET surface area of not more than 30 m$^2$/g were previously suggested for improving the fire retardancy of thermoplastic resins including polyolefins or ABS resin (see Japanese Laid-Open Pat. No. 90192/77). This prior Patent Publication is quite silent on the technical problem of inhibiting thermal and ultraviolet degradation of the aforesaid thermoplastic resins containing halogens and/or acidic components. Furthermore, this Patent Publication discloses that in order to obtain an effective fire-retarding effect, the fire-retardant is used in an amount of about 50 to about 150 parts by weight per 100 parts by weight of the thermoplastic resin.

Japanese Pat. Nos. 32198/72 and 8394/73 disclose that hydrotalcites are excellent deoxidizing agents. These Patent Publications, however, fail to describe anything about the technical problem of inhibiting thermal and ultraviolet degradation of thermoplastic resins containing halogens and/or acidic components and the solving of this technical problem. Accordingly, these Patent Publications do not at all state what hydrotalcites are to be used in inhibiting thermal and ultraviolet degradation of such thermoplastic resins.

The present inventors worked extensively on the inhibition of thermal and ultraviolet degradation of thermoplastic resins containing halogens and/or acidic components derived from catalysts and/or monomers and/or post-halogenation. As a result, they found that when hydrotalcites easily available on the market are incorporated in vinyl chloride resins for example, these hydrotalcites act to accelerate the dechlorination of the resins under heat encountered during molding or otherwise to cause decomposition, blackening or foaming of the resins, and moreover that these hydrotalcites have poor dispersibility in the resins and adversely affect the rheological properties of the resins during molding and the appearance of the molded products.

In view of the fact that although hydrotalcites have superior ability to neutralize acids and are by themselves nearly neutral, they do not prove effective in inhibiting thermal and ultraviolet degradation as described above, the present inventors made further investigations for the cause of this difficulty. These investigations led to the discovery that ordinary hydrotalcites have a crystallite size of as small as about 100 to about 300 Å, a high crystal strain and a strong tendency to aggregation (forming aggregates of about 20 to 70 microns in size); that because water is chemically adsorbed to numerous micropores of the aggregates of the hydrotalcite particles and the temperature at which water of crystallization begins to be liberated is low, the aforesaid defects are caused; and that these ordinary hydrotalcites have a BET specific surface area of at least about 50 m$^2$/g and the use of such hydrotalcites should be avoided.

On further investigations, the present inventors found that the aforesaid technical problem of inhibiting thermal and ultraviolet degradation of the thermoplastic resins containing halogens and/or acidic components can be solved completely by using an inhibitory amount, for example about 0.01 to about 5 parts by weight, preferably up to about 2 parts by weight, more preferably up to about 1 parts by weight, per 100 parts by weight of the resin, of a hydrotalcite in a specified crystal grain form having a BET specific surface area of not more than 30 m$^2$/g, especially not more than 20 m$^2$/g.

It was also found that these hydrotalcites having the aforesaid specified crystal grain form have a crystallite size of at least about 600 Å showing sufficient crystal growth, reduced crystal strain and much reduced tendency to aggregation, and the use of these hydrotalcites having the specified BET specific surface area can lead to the achievement of an effect of inhibiting thermal and ultraviolet degradation of the thermoplastic resins with a good reproducibility of the inhibitory effect and also to the solution of the aforesaid technical problem. It was especially noted that a thermoplastic resin composition comprising the specified hydrotalcite in accordance with this invention can be formed into an ultrathin film of practical value having a thickness of, say, about 5 microns, which ultrathin film cannot be formed when ordinary hydrotalcites are used.

It is an object of this invention to provide a method for inhibiting thermal and ultraviolet degradation of thermoplastic resins containing halogens and/or acidic components derived from catalysts and/or monomers and/or post-halogenation (excepting olefinic resins containing halogens derived from polymerization catalysts and/or post-chlorination) with a good reproducibility of the inhibiting effect without involving troubles such as the corroding tendency of the resins, the poor dispersibility of the inhibitors in the resin, the poor flowability of the resin composition during molding and the poor appearance of molded products.

Another object of this invention is to provide a thermoplastic resin composition having improved stability to thermal and ultraviolet degradation.

The above and other objects and advantages of this invention will become more apparent from the following description.

The hydrotalcites used in this invention have a BET specific surface area of not more than 30 m$^2$/g, preferably not more than 20 m$^2$/g, especially preferably not more than 15 m$^2$/g. These hydrotalcites have a fully grown crystallite size, a low crystal strain, and a much reduced tendency to aggregation. In the present invention, the use of these hydrotalcites is recommended. Preferably, these hydrotalcites further have an average secondary particle size of not more than 5 microns, preferably not more than 1.5 microns, especially preferably not more than 1 micron.

More preferably, the hydrotalcites used in the invention further have a crystallite size, in the <003> direction determined by X-ray diffraction, of at least 600 Å, preferably at least 1000 Å.

Usually available hydrotalcites have a BET specific surface area of more than about 50 m$^2$/g, an average secondary particle size of more than about 10 microns and a crystallite size in the <003> direction of less than about 300 Å. The use of such hydrotalcites should be avoided in the present invention.

Hydrotalcites meeting the aforesaid BET specific surface area conditions and having the following formula (1) are used in this invention.

$$Mg_{1-x}Al_x(OH)_2 A_{x/n}{}^{n-} \cdot m H_2O \tag{1}$$

wherein $0 < x \leq 0.5$, m is a positive number, for example a number of from 0.1 to 1, and $A^{n-}$ represents an anion having a valence of n.

Examples of the anion $A^{n-}$ are $CO_3{}^{2-}$, $SO_4{}^{2-}$,

and $HPO_4{}^{2-}$. In the present invention, two or more anions $A_{x/n}{}^{n-}$ may be contained, and in this case, x/n is a total value for the two or more anions.

In the present invention, the term "thermoplastic resins containing halogens and/or acidic components" excludes olefinic resins containing halogens derived from polymerization catalysts and/or post-halogenation. Thus, for example, homopolymers and copolymers of alpha-olefins, copolymers of at least one alpha-olefin and dienes, post-chlorinated products of these polymers and copolymers, and blends of these halogen-containing olefinic resins, for example polyethylene, polypropylene, poly-1-butene, poly-4-methyl-1-pentene, and ethylenepropylene copolymer which are produced by using halogen-containing Ziegler-type catalysts, post-chlorinated polyethylene and the like, are excluded from the thermoplastic resins used in this invention containing halogens and/or acidic components.

Examples of the thermoplastic resins containing halogens and/or acidic components in this invention include thermoplastic resins produced by using catalysts containing halogens and/or acidic components such as boron trifluoride, tin tetrachloride, sulfuric acid or hydrochloric acid and containing the halogens and/or acidic sub components derived from these catalysts, for example styrene resins such as polystyrene, AS resin (acrylonitrile-styrene copolymer), ABS resin (acrylonitrile/butadiene/styrene copolymer), BS resin (butadiene/styrene copolymer), acrylic resins such as polyacrylates and methacrylic resins such as polymethacrylates; halogen-containing thermoplastic vinyl resins such as vinyl chloride polymer or copolymers such as vinyl chloride/vinyl acetate resin, vinylidene polymer or copolymers fluoroethylene polymers or copolymers and polymer blends containing vinyl chloride resins; chlorine or fluorine-containing rubbers such as chlorinated polyvinyl chloride, chloroprene and chlorinated isobutylene rubber and fluorinated rubber; and halogen-containing thermoplastic resins such as post-chlorinated vinyl chloride polymer or copolymers, polytetrafluoroethylene, fluorinated ethylene-propylene copolymer, polychlorotrifluoroethylene acetate-containing thermoplastic resins such as polyvinyl acetate or ethylenevinylacetate copolymer, and blends of these resins with each other or with other resins.

In the practice of this invention, the specified hydrotalcite is used in an amount of about 0.01 to about 5, preferably about 0.01 to about 2 parts by weight, more preferably about 0.01 to 1.0 part by weight, especially preferably about 0.05 to about 1.0 part by weight.

There is no particular restriction on the way in which the hydrotalcite is mixed with the resin, and the same methods of mixing as used conventionally in incorporating stabilizers or fillers into such resins may be utilized in this invention. For example, the mixing can be performed by using such devices as a ribbon blender, high-speed mixer, "Ko-kneader", pelletizer, mixing roll, extruder or intensive mixer.

The hydrotalcite particles used in this invention may be surface-treated with an anionic surface-active agent, and this embodiment frequently gives favorable results.

In the surface treatment, the suitable amount of the anionic surface-active agent is about 1 to about 10% by weight, preferably about 1 to about 5% by weight, based on the weight of the hydrotalcite. For example, a powder of the hydrotalcite is added to an aqueous solution of an anionic surface-active agent such as sodium stearate with sufficient stirring. Or conversely, the aqueous solution of sodium stearate is added to a suspension of the hydrotalcite powder to cause chemical adsorption of the surface-active agent to the surface of the solid powder. When such a surface-treatment is carried out, the dispersibility of the hydrotalcite is increased, and the flowability of the resin composition during molding is improved, thus contributing more to the improvement of the appearance of a molded article from the resin composition and to the inhibition of its tendency to causing corrosion.

Examples of the anionic surface-active agents used include alkali metal salts of higher fatty acids of the formula RCOOM in which R is an alkyl group having 3 to 40 carbon atoms and M represents an alkali metal atom; alylsulfates of the formula ROSO₃M in which R and M are as defined; alkylsulfonates of the formula RSO₃M in which R and M are as defined; alkylarylsulfonates of the formula R-aryl-SO₃M in which R and M are as defined and the aryl represents phenyl, naphthyl, tolyl, etc.; and sulfosuccinic ester salts expressed by the formula

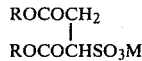

in which R and M are as defined.

Specific examples of such surfactants include sodium stearate, potassium stearate, sodium oleate, potassium oleate, sodium palmitate, potassium palmitate, sodium laurate, potassium laurate, potassium behenate, sodium laurylbenzenesulfonate, potassium octadecylsulfate, sodium laurylsulfonate and disodium 2-sulfoethyl α-sulfostearate.

In addition to the incorporation of the specified hydrotalcite, other additives used conventionally for thermoplastic resins may be used in the practice of the method of this invention. Examples of such additives are stabilizers, for example organotin compounds such as dioctyltin laurate or dioctyltin maleate, organic phosphites such as tris(nonylphenyl)phosphite or tristearyl phosphite, epoxy compounds such as epoxidized soybean oil or epoxidized linseed oil, amino compounds such as diphenylamine or di-o-tolylethylenediamine, polyhydric alcohols such as partially saponified polyvinyl alcohol, and fatty acid salts of at least one of zinc or alkaline earth metals such as zinc stearate, calcium-zinc stearate; antioxidants such as 2,6-di-t-butyl-p-cresol, 2,5-di-t-butyl hydroquinone, 2,2′-methylenebis(4-methyl-6-t-butylphenol), 4,4′-thiobis-(6-t-butylphenol), 4,4′-thiobis-(6-t-butyl-m-cresol), and octadecyl-3-(3′,5′-di-t-butyl-4′-hydroxyphenyl) propionate; ultraviolet absorbers such as 2-hyeroxy-4-octoxybenzophenone, 2- (2′-hydroxy-5-methylphenyl)benzotriazole and ethyl 2-cyano-3,3-diphenylacrylate; antistatic agents such as pentaerythritol monostearate, sorbitan monopalmitate, polyethylene oxide and carbowax; lubricants such as calcium stearate, zinc stearate, butyl stearate and ethylenebis stearamide; plasticizers such as dimethyl phthalate, diethyl phthalate, olefic acid esters, phosphoric acid esters, waxes, and liquid paraffin; coloring agents such as carbon black, phthalocyanine, quinacridone, indoline, azo pigments, titanium oxide and red iron oxide; and fillers such as asbestos, glass fibers, talc, mica, wallastonite, calcium silicate, aluminum silicate and calcium carbonate.

The amounts of these additives can be selected as desired. For example the amounts based on the weight of the olefin resin are about 0.1 to about 5% for the stabilizers, about 0.01 to about 1% for the antioxidants, about 0.01 to about 1% for the ultraviolet absorbers, about 0.01 to about 1% for the antistatic agents, about 0.1 to about 5% for the lubricants, about 0.1 to about 50% for the plasticizers, about 0.1 to about 5% for the coloring agents, and about 1 to about 50% for the fillers.

The hydrotalcites can be produced by various methods. For example, they can be obtained by heat-treating in aqueous media the hydrotalcites obtained by the methods disclosed in Japanese Pat. Nos. 2280/71, 32198/72, 30039/75, 29477/73 and 29129/76, U.S. Pat. Nos. 3539306, 3650704 and 3875525, British Pat. No. 1185920, and West German Pat. No. 1592126.

According to one embodiment, the hydrotalcite in accordance with this invention is obtained by heat-treating a hydrotalcite obtained by any of the methods disclosed in the above-cited prior patent documents in an autoclave at a temperature of at least about 150° C., for example 150° to 250° C., for a period of about 5 to about 30 hours in an aqueous medium. The heat-treatment is performed under pressure until the hydrotalcite meets the BET specific parameter (i) and higher temperatures are preferred. Temperatures above about 250° C. may be used, but this does not particularly bring about any particular benefit. Thus, the use of temperatures within the above-specified range is suitable.

The following examples illustrate the present invention more specifically.

In these examples, the heat stability, ultraviolet stability and appearance of a molded article, and the properties of hydrotalcite particles were tested and evaluated by the following methods.

(1) Heat stability

The resin composition was press-formed into a sheet having a size of 30×30 mm and a thickness of 1 mm. The resulting sample was put into a dryer kept at a predetermined temperature and subjected to a thermal degradation test. The time (minutes) which elapsed until the sample was partly looked blackened was determined. The longer this time is, the higher is the thermal stability.

(2) A sample obtained in the same way as in (1) was exposed to irradiation of ultraviolet light at a wavelength of 2537 mµ at 60° C., and the time (days) which elapsed until the sample was blackened was determined. The longer this time is, the higher the ultraviolet stability is.

(3) Appearance of an injection-molded article

The resin composition was injection-molded into a plate having a size of 50×50 mm and a thickness of 1 mm, and the appearance of the resulting molded article was examined visually with the naked eye.

EXAMPLES 1 to 3 AND COMPARATIVE EXAMPLES 1 AND 2

| PVC ($\overline{P}$ = 1100) | 100 parts by weight |
| Red iron oxide | 2 parts by weight |
| Zinc stearate | 1 part by weight |
| Dibutyltin maleate (neutralizing agent) | 0.3 part by weight |
| Inhibitor | (indicated in Table 1) |

The above ingredients were uniformly mixed and kneaded by a roll mill at 150° to 160° C. for about 5 minutes to form a thermoplastic resin composition.

Test specimens were prepared from the above resin composition and tested using the testing methods (1) to (3) shown hereinabove. The results are shown in Table 1.

TABLE 1

| Run No. | Formula | BET surface area ($m^2/g$) | Average secondary particle size (microns) | Crystallite size (Å) | Amount (parts by weight per 100 parts of resin) | Thermal stability (min.) | Ultraviolet stability (days) | Appearance of the molded article |
|---|---|---|---|---|---|---|---|---|
| Ex. 1 | $Mg_{0.7}Al_{0.3}(OH)_3(CO_3)_{0.15} \cdot 0.75H_2O$ | 9 | 0.3 | 2380 | 0.3 | 8 | 6 | Good |
| Ex. 2 | $Mg_{0.7}Al_{0.3}(OH)_3(CO_3)_{0.15} \cdot 0.75H_2O$ | 9 | 0.3 | 2380 | 0.6 | 9 | 12 | Good |
| Ex. 3 | $Mg_{0.8}Al_{0.2}(OH)_2(CO_3)_{0.1} \cdot 0.61H_2O$ | 17 | 0.9 | 1060 | 0.4 | 8 | 10 | Good |
| Comparative Ex. 1 | $Mg_{0.7}Al_{0.3}(OH)_2(CO_3)_{0.15} \cdot 0.49 H_2O$ | 64 | 7.6 | 230 | 0.3 | <1 | 3 | Flashes occurred |
| Comparative Ex. 2 | MgO | 30 | 2.8 | 520 | 0.3 | 5 | 4 | Flashes occurred |
| Control | None | — | — | — | — | 2 | 2 | Good |

EXAMPLE 4 AND COMPARATIVE EXAMPLES 3 AND 4

| PVC ($\overline{P}$ = 1450) | 100 parts by weight |
| Dioctylphthalate | 40 parts by weight |
| Red iron oxide | 2 parts by weight |
| Zinc stearate | 1 part by weight |
| Dibutyltin maleate (neutralizing agent) | 0.3 part by weight |
| Inhibitor | (indicated in Table 2) |

The above ingredients were uniformly mixed and kneaded by a roll mill at 140° C. for 3 minutes.

Test specimens were prepared from the resulting resin composition and tested by the testing methods (1) to (3) described hereinabove. The results are shown in Table 2.

TABLE 2

| Run | Formula | BET specific surface area ($m^2/g$) | Average secondary particle size (microns) | Crystallite size (Å) | Amount (parts per 100 parts by weight of resin) | Heat stability (min.) | Ultraviolet stability (days) | Appearance of the molded article |
|---|---|---|---|---|---|---|---|---|
| Ex. 4 | $Mg_{0.75}Al_{0.25}(OH)_2(CO_3)_{0.125} \cdot 0.625H_2O$ | 12 | 0.6 | 1250 | 0.3 | 17 | 8 | Good |
| Comparative Ex. 3 | $Mg_{0.75}Al_{0.25}(OH)_2(CO_3)_{0.125} \cdot 0.5H_2O$ | 92 | 9.7 | 180 | 0.3 | 1 | 2 | Flashes occurred |
| Comparative Ex. 4 | MgO | 30 | 2.8 | 520 | 0.3 | 8 | 5 | Flashes occurred |

TABLE 2-continued

| Run | Formula | Inhibitor BET specific surface area (m²/g) | Average secondary particle size (microns) | Crystallite size (Å) | Amount (parts per 100 parts by weight of resin) | Heat stability (min.) | Ultraviolet stability (days) | Appearance of the molded article |
|---|---|---|---|---|---|---|---|---|
| Control | None | — | — | — | — | 2 | 3 | Good |

EXAMPLES 5 AND 6 AND COMPARATIVE slightly yellow was measured. The results are shown in Table 3.

TABLE 3

| Run No. | Formula | Inhibitor BET surface area (m²/g) | Average secondary particle size (microns) | Crystallite size (Å) | Amount (parts by weight per 100 parts of resin) | Anionic surface-active agent Type | Amount (wt. %) | Type of the resin | Heat stability (minutes) |
|---|---|---|---|---|---|---|---|---|---|
| Ex. 5 | $Mg_{0.7}Al_{0.3}(OH)_2(CO_3)_{0.15} \cdot 0.55H_2O$ | 10 | 0.4 | 1820 | 1.0 | Sodium stearate | 3.0 | PVC($\bar{P}$ = 700) | 68 |
| Ex. 6 | $Mg_{0.6}Al_{0.4}(OH)_2(CO_3)_{0.20} \cdot 0.52H_2O$ | 8 | 0.5 | 2410 | 1.0 | Sodium oleate | 2.5 | PVC | 52 |
| Comparative Ex. 5 | Calcium stearate-zinc complex stabilizer | — | — | — | 2.0 | — | — | PVC | 30 |
| Comparative Ex. 6 | Dibasic lead stearate | — | — | — | 1.0 | — | — | PVC | 35 |
| Ex. 7 | $Mg_{0.68}Al_{0.32}(OH)_2-(CO_3)_{0.16} \cdot 0.42H_2O$ | 12 | 0.3 | 1270 | 0.5 | Sodium stearate | 4.0 | ABS | 320 |
| Control | None | — | — | — | — | — | — | ABS | 65 |

EXAMPLES 5 AND 6

| | |
|---|---|
| PVC ($\bar{P}$ = 700) | 100 parts by weight |
| Zinc stearate | 0.75 parts by weight |
| Dioctyl phthalate | 25 parts by weight |
| Tin maleate | 0.3 parts by weight |
| Inhibitor | (indicated in Table 3) |

The hydrotalcite used as the inhibitor was used either directly or after it was treated with each of the surface-active agents shown in Table 3.

The above ingredients were uniformly mixed, and kneaded by a rubber roll mill at 145° to 150° C. for 5 minutes. The mixture was molded into a plate having a thickness of 1 mm. The plate was cut to a size of 30×30 mm. The plate sample was put into an oven kept at 180±1° C. to test its heat stability. The results are shown in Table 3.

EXAMPLE 7

| | |
|---|---|
| ABS resin (composed of 12 parts by weight of butadiene, 13 parts by weight of styrene and 25 parts by weight of acrylonitrile) | 100 parts by weight |
| 2,6-Di-t-butyl-4-methylphenol | 1.0 part by weight |
| Dilauryl-3,3-thio-dipropionate | 1.0 part by weight |
| Inhibitor | 0.5 part by weight |

The above ingredients were mixed uniformly, and molded into a plate having a size of 90×50×25 mm. The plate was allowed to stand in a hor air drying oven at 160° C., and the time which elapsed until it turned slightly yellow was measured.

What we claim is:

1. A method for inhibiting the thermal or ultraviolet degradation of a thermoplastic resin containing halogens and/or a thermoplastic resin containing a catalyst-derived acidic sub-component excepting olefinic resins, which comprises mixing said thermoplastic resin with about 0.01 to about 5 parts by weight, per 100 parts by weight of said resin, of a hydrotalcite of the following formula $$Mg_{1-x}Al_x(OH)_2A_{x/n}{}^{n-} \cdot mH_2O$$

wherein $0 < x \leq 0.5$, m is a positive number, and $A^{n-}$ represents an anion having a valence of n, or a product resulting from surface-treatment of said hydrotalcite with an anionic surface-active agent, said hydrotalcite having a BET specific surface area of not more than 30 m²/g.

2. The method of claim 1 wherein said hydrotalcite has an average secondary particle size of not more than 5 microns.

3. The method of claim 1 wherein said hydrotalcite has a crystallite size, in the <003> direction, determined by an X-ray diffraction method, of at least 600 Å.

4. The method of claim 1 wherein the amount of said hydrotalcite is about 0.01 to about 2 parts by weight per 100 parts by weight of said thermoplastic resin.

5. A thermoplastic resin composition having stability to thermal or ultraviolet degradation, comprising
   (a) 100 parts by weight of a thermoplastic resin containing halogens and/or a thermoplastic resin containing a catalyst-derived acidic sub-component excepting olefinic resins, and
   (b) about 0.01 to about 5 parts by weight of a hydrotalcite of the following formula $$Mg_{1-x}Al_x(OH)_2A_{x/n}{}^{n-}\cdot mH_2O$$

wherein $0<x\leq 0.5$, m is a positive number, and $A^{n-}$ respresents an anion having a valence of n, or a product resulting from surface-treatment of said hydrotalcite with an anionic surface-active agent, said hydrotalcite having a BET specific surface area of not more than 30 m²/g.

6. The composition of claim 5 wherein said hydrotalcite has an average secondary particle size of not more than 5 microns.

7. The composition of claims 5 or 6 wherein said hydrotalcite has a crystallite size, in the <003> direction determined by an X-ray diffraction method, of at least 600 Å.

8. A composition according to claim 7 in which the thermoplastic is a halogen-containing resin.

* * * * *